US009450232B2

(12) United States Patent
Furukawa et al.

(10) Patent No.: US 9,450,232 B2
(45) Date of Patent: Sep. 20, 2016

(54) PROCESS FOR PRODUCING NEGATIVE PLATE FOR LEAD STORAGE BATTERY, AND LEAD STORAGE BATTERY

(75) Inventors: Jun Furukawa, Fukushima (JP);
Daisuke Momma, Fukushima (JP);
Toshimichi Takada, Fukushima (JP);
Trieu Lan Lam, Victoria (AU); Rosalie Louey, Victoria (AU); Peter Nigel Haigh, Victoria (AU)

(73) Assignees: COMMONWEALTH SCIENTIFIC AND INDUSTRIAL RESEARCH ORGANISATION, Campbell (AU);
THE FURUKAWA BATTERY CO., LTD., Yokohama (JP)

(*) Notice: Subject to any disclaimer, the term of this patent is extended or adjusted under 35 U.S.C. 154(b) by 975 days.

(21) Appl. No.: 13/265,944

(22) PCT Filed: Mar. 19, 2010

(86) PCT No.: PCT/JP2010/055479
§ 371 (c)(1),
(2), (4) Date: Dec. 22, 2011

(87) PCT Pub. No.: WO2010/122873
PCT Pub. Date: Oct. 28, 2010

(65) Prior Publication Data
US 2012/0094174 A1     Apr. 19, 2012

(30) Foreign Application Priority Data

Apr. 23, 2009  (JP) .................................. 2009-104825

(51) Int. Cl.
| | |
|---|---|
| H01M 2/04 | (2006.01) |
| H01M 4/20 | (2006.01) |
| H01M 4/22 | (2006.01) |
| H01M 4/36 | (2006.01) |
| H01M 4/62 | (2006.01) |
| H01M 4/04 | (2006.01) |
| H01M 4/02 | (2006.01) |
| H01M 10/06 | (2006.01) |

(52) U.S. Cl.
CPC ............ *H01M 4/20* (2013.01); *H01M 4/0416* (2013.01); *H01M 4/0445* (2013.01); *H01M 4/0452* (2013.01); *H01M 4/22* (2013.01); *H01M 4/366* (2013.01); *H01M 4/625* (2013.01); *H01M 4/622* (2013.01); *H01M 4/623* (2013.01); *H01M 10/06* (2013.01); *H01M 2004/027* (2013.01); *Y02E 60/126* (2013.01)

(58) Field of Classification Search
CPC ........ H01M 4/20; H01M 4/22; H01M 4/366; H01M 4/625; H01M 4/0416; H01M 4/0445; H01M 4/0452; H01M 2004/027; H01M 10/06; H01M 4/622; H01M 4/623; Y02E 60/126

USPC ........................................... 429/204; 427/532
See application file for complete search history.

(56) References Cited

U.S. PATENT DOCUMENTS

| | | | |
|---|---|---|---|
| 2,938,063 A | 5/1960 | Greenburg et al. |
| 3,881,954 A | 5/1975 | Maskalick |
| 4,215,190 A | 7/1980 | Ferrando et al. |
| 4,422,987 A | 12/1983 | Arimatsu |
| 4,507,372 A | 3/1985 | Rowlette |
| 4,567,284 A | 1/1986 | Monzyk et al. |
| 4,576,879 A | 3/1986 | Nakazawa et al. |
| 4,770,954 A | 9/1988 | Noordenbos |
| 4,882,132 A | 11/1989 | Monzyk et al. |
| 4,975,253 A | 12/1990 | Monzyk et al. |
| 5,069,990 A | 12/1991 | Yoshimura et al. |
| 5,077,151 A | 12/1991 | Yasuda et al. |

(Continued)

FOREIGN PATENT DOCUMENTS

| | | |
|---|---|---|
| CN | 1357899 | 7/2002 |
| CN | 101079510 | 11/2007 |

(Continued)

OTHER PUBLICATIONS

Russian Patent Application No. 2012111222—Office Action (English translation included), mailed Aug. 27, 2014.

(Continued)

*Primary Examiner* — Gary Harris
(74) *Attorney, Agent, or Firm* — Nixon & Vanderhye P.C.

(57) ABSTRACT

To provide a method for producing a lead-acid battery negative plate for use in a storage battery which provides improved deteriorated rapid discharge characteristics by preventing an interfacial separation between a negative active material-filled plate and a carbon mixture-coated layer, which is a problem in a negative plate having such a configuration that the carbon mixture coated layer is formed on the surface of the negative active material-filled plate.

A coating layer of a carbon mixture is formed at least in a part of a surface of a negative active material-filled plate. The carbon mixture is prepared by mixing two kinds of carbon materials consisting of a first carbon material having conductive properties and a second carbon material having capacitive capacitance and/or pseudo capacitive capacitance and a binding agent. Subsequently, a sufficient amount of lead ions are generated enough to be moved from the negative active material-filled plate into the carbon mixture-coated layer. Thereafter, a formation treatment or an initial charge treatment is performed to precipitate lead so that the carbon mixture-coated layer and the negative plate are connected and integrated, at least in a part of a respective interfacial surface thereof, by the precipitated lead.

14 Claims, No Drawings

(56) References Cited

U.S. PATENT DOCUMENTS

| | | |
|---|---|---|
| 5,154,989 A | 10/1992 | Howard et al. |
| 5,252,105 A | 10/1993 | Witherspoon et al. |
| 5,260,855 A | 11/1993 | Kaschmitter et al. |
| 5,384,685 A | 1/1995 | Tong et al. |
| 5,393,617 A * | 2/1995 | Klein ............... H01M 4/0435 429/153 |
| 5,419,977 A | 5/1995 | Weiss et al. |
| 5,429,893 A | 7/1995 | Thomas |
| 5,439,756 A | 8/1995 | Anani et al. |
| 5,455,999 A | 10/1995 | Weiss et al. |
| 5,458,043 A | 10/1995 | Jensen et al. |
| 5,464,453 A | 11/1995 | Tong et al. |
| 5,491,399 A | 2/1996 | Gregory et al. |
| 5,518,833 A | 5/1996 | Repplinger et al. |
| 5,526,223 A | 6/1996 | Wu et al. |
| 5,529,971 A | 6/1996 | Kaschmitter et al. |
| 5,534,369 A | 7/1996 | Nagaura |
| 5,547,783 A | 8/1996 | Funato et al. |
| 5,574,353 A | 11/1996 | Bai et al. |
| 5,587,250 A | 12/1996 | Thomas et al. |
| 5,604,426 A | 2/1997 | Okamura et al. |
| 5,626,729 A | 5/1997 | Thompson et al. |
| 5,670,266 A | 9/1997 | Thomas et al. |
| 5,705,259 A | 1/1998 | Mrotek et al. |
| 5,744,258 A | 4/1998 | Bai et al. |
| 5,781,403 A | 7/1998 | Aoki et al. |
| 5,789,338 A | 8/1998 | Kaschmitter et al. |
| 5,821,006 A | 10/1998 | Patel et al. |
| 5,821,007 A | 10/1998 | Harshe et al. |
| 5,849,426 A | 12/1998 | Thomas et al. |
| 5,916,699 A | 6/1999 | Thomas et al. |
| 5,935,724 A | 8/1999 | Spillman et al. |
| 5,935,728 A | 8/1999 | Spillman et al. |
| 5,960,898 A | 10/1999 | Okada et al. |
| 5,993,983 A | 11/1999 | Rozon |
| 6,005,764 A | 12/1999 | Anderson et al. |
| 6,011,379 A | 1/2000 | Singh et al. |
| 6,072,691 A | 6/2000 | Suhara et al. |
| 6,087,812 A | 7/2000 | Thomas et al. |
| 6,088,217 A | 7/2000 | Patel et al. |
| 6,117,585 A | 9/2000 | Anani et al. |
| 6,190,805 B1 | 2/2001 | Takeuchi et al. |
| 6,195,252 B1 | 2/2001 | Belyakov et al. |
| 6,208,502 B1 | 3/2001 | Hudis et al. |
| 6,208,878 B1 | 3/2001 | Hattori et al. |
| 6,222,723 B1 | 4/2001 | Razoumov et al. |
| 6,252,762 B1 | 6/2001 | Amatucci |
| 6,294,893 B1 | 9/2001 | De Abreu |
| 6,304,467 B1 | 10/2001 | Nebrigic |
| 6,310,789 B1 | 10/2001 | Nebrigic et al. |
| 6,316,563 B2 | 11/2001 | Naijo et al. |
| 6,331,365 B1 | 12/2001 | King |
| 6,333,123 B1 | 12/2001 | Davis et al. |
| 6,466,429 B1 | 10/2002 | Volfkovich et al. |
| 6,509,116 B1 | 1/2003 | Kurosaki et al. |
| 6,509,713 B2 | 1/2003 | De Abreu |
| 6,517,972 B1 | 2/2003 | Amatucci |
| 6,541,140 B1 | 4/2003 | Spillman et al. |
| 6,576,365 B1 | 6/2003 | Meitav et al. |
| 6,585,915 B2 | 7/2003 | Shinozaki et al. |
| 6,610,440 B1 | 8/2003 | LaFollette et al. |
| 6,623,884 B1 | 9/2003 | Spillman et al. |
| 6,628,504 B2 | 9/2003 | Volfkovich et al. |
| 6,631,073 B1 | 10/2003 | Sakata et al. |
| 6,643,151 B1 | 11/2003 | Nebrigic et al. |
| 6,646,415 B1 | 11/2003 | Nebrigic et al. |
| 6,653,014 B2 | 11/2003 | Anderson et al. |
| 6,680,600 B2 | 1/2004 | Emori et al. |
| 6,687,116 B2 | 2/2004 | Hudis |
| 6,706,079 B1 | 3/2004 | Shmatko et al. |
| 6,737,822 B2 | 5/2004 | King |
| 6,749,963 B2 | 6/2004 | Kurosaki et al. |
| 6,765,363 B2 | 7/2004 | Lafollette et al. |
| 6,869,731 B2 | 3/2005 | Nobuta et al. |
| 6,887,617 B2 | 5/2005 | Sato et al. |
| 6,911,273 B2 | 6/2005 | Faris |
| 7,006,346 B2 | 2/2006 | Volfkovich et al. |
| 7,035,084 B2 | 4/2006 | Kaneko et al. |
| 7,049,792 B2 | 5/2006 | King |
| 7,057,880 B2 | 6/2006 | Kurosaki et al. |
| 7,074,688 B2 | 7/2006 | Kurihara et al. |
| 7,083,876 B2 | 8/2006 | Honbo et al. |
| 7,110,242 B2 | 9/2006 | Adrianov et al. |
| 7,119,047 B1 | 10/2006 | Adrianov et al. |
| 7,144,654 B2 | 12/2006 | Lafollette et al. |
| 7,166,384 B2 | 1/2007 | Lafollette et al. |
| 7,186,473 B2 | 3/2007 | Shiue et al. |
| 7,358,008 B2 | 4/2008 | Nanno et al. |
| 7,397,650 B2 | 7/2008 | Sato et al. |
| 7,420,295 B2 | 9/2008 | Omae et al. |
| 7,462,419 B2 | 12/2008 | Lafollette et al. |
| 7,468,221 B2 | 12/2008 | Lafollette et al. |
| 7,649,335 B2 | 1/2010 | Ishikawa et al. |
| 7,742,279 B2 | 6/2010 | Takahashi et al. |
| 7,862,931 B2 | 1/2011 | Furukawa et al. |
| 7,923,151 B2 | 4/2011 | Lam et al. |
| 8,017,273 B2 | 9/2011 | Lara-Curzio et al. |
| 8,057,937 B2 | 11/2011 | Sung et al. |
| 2001/0009734 A1 | 7/2001 | Clough |
| 2001/0011119 A1 | 8/2001 | Naijo et al. |
| 2001/0033501 A1 | 10/2001 | Nebrigic |
| 2001/0044045 A1 | 11/2001 | Sato et al. |
| 2002/0036478 A1 | 3/2002 | De abreu |
| 2002/0037452 A1 | 3/2002 | Schmidt |
| 2002/0058185 A1 | 5/2002 | Kurosaki et al. |
| 2002/0096661 A1 | 7/2002 | Shinozaki et al. |
| 2002/0132164 A1 | 9/2002 | Kaneko et al. |
| 2002/0155327 A1 | 10/2002 | Faris |
| 2002/0158606 A1 | 10/2002 | King |
| 2002/0161146 A1 | 10/2002 | Naijo et al. |
| 2002/0163771 A1 | 11/2002 | Volfkovich et al. |
| 2002/0176221 A1 | 11/2002 | Hudis |
| 2002/0182485 A1 | 12/2002 | Anderson et al. |
| 2002/0196597 A1 | 12/2002 | Volfkovich et al. |
| 2003/0006737 A1 | 1/2003 | Lafollette et al. |
| 2003/0007317 A1 | 1/2003 | Hudis |
| 2003/0008212 A1 | 1/2003 | Akashi et al. |
| 2003/0011964 A1 | 1/2003 | Hudis |
| 2003/0035982 A1 | 2/2003 | Ryu et al. |
| 2003/0049528 A1 | 3/2003 | Honbo et al. |
| 2003/0070916 A1 | 4/2003 | Nanno et al. |
| 2003/0091905 A1 | 5/2003 | Nobuta et al. |
| 2003/0094923 A1 | 5/2003 | Emori et al. |
| 2003/0129458 A1 | 7/2003 | Bailey |
| 2003/0152815 A1 | 8/2003 | Lafollette et al. |
| 2003/0188901 A1 | 10/2003 | Ovshinsky et al. |
| 2003/0219653 A1 | 11/2003 | Kelley et al. |
| 2003/0232238 A1 | 12/2003 | Fleming et al. |
| 2004/0009161 A1 | 1/2004 | Escary |
| 2004/0018421 A1 | 1/2004 | Lafollette et al. |
| 2004/0038087 A1 | 2/2004 | Shiue et al. |
| 2004/0053124 A1 | 3/2004 | Lafollette et al. |
| 2004/0057194 A1 | 3/2004 | Hudis et al. |
| 2004/0091777 A1 | 5/2004 | Lam et al. |
| 2004/0112486 A1 | 6/2004 | Aust et al. |
| 2004/0121204 A1 | 6/2004 | Adelman et al. |
| 2004/0141282 A1 | 7/2004 | Hudis |
| 2004/0142243 A1 | 7/2004 | Furukawa et al. |
| 2004/0161640 A1 | 8/2004 | Salot |
| 2004/0189226 A1 | 9/2004 | King |
| 2004/0209165 A1 | 10/2004 | Kurosaki et al. |
| 2004/0246658 A1 | 12/2004 | Adrianov et al. |
| 2005/0002150 A1 | 1/2005 | Volfkovich et al. |
| 2005/0081350 A1 | 4/2005 | Kurihara et al. |
| 2005/0089728 A1 | 4/2005 | Arai et al. |
| 2005/0093380 A1 | 5/2005 | Lafollette et al. |
| 2005/0110457 A1 | 5/2005 | Lafollette et al. |
| 2005/0112420 A1 | 5/2005 | Lai et al. |
| 2005/0147885 A1 | 7/2005 | Sato et al. |
| 2005/0170242 A1 | 8/2005 | Sato et al. |
| 2005/0221191 A1 | 10/2005 | Kondo et al. |
| 2005/0253458 A1 | 11/2005 | Omae et al. |
| 2005/0260497 A1 | 11/2005 | Kumashiro et al. |
| 2006/0038536 A1 | 2/2006 | Lafollette et al. |

(56) References Cited

U.S. PATENT DOCUMENTS

| | | | |
|---|---|---|---|
| 2006/0115732 A1 | 6/2006 | Zaghib et al. | |
| 2006/0172196 A1 | 8/2006 | Fukunaga | |
| 2006/0223701 A1 | 10/2006 | Adrianov et al. | |
| 2006/0269801 A1 | 11/2006 | Honbo et al. | |
| 2007/0104981 A1 | 5/2007 | Lam et al. | |
| 2007/0128472 A1* | 6/2007 | Tierney et al. | 429/9 |
| 2007/0247787 A1 | 10/2007 | Nakagawa et al. | |
| 2008/0197810 A1 | 8/2008 | Ishikawa et al. | |
| 2008/0199737 A1 | 8/2008 | Kazaryan et al. | |
| 2008/0206638 A1 | 8/2008 | Takahashi et al. | |
| 2008/0264291 A1 | 10/2008 | Pike et al. | |
| 2008/0318135 A1 | 12/2008 | Sung et al. | |
| 2009/0059474 A1 | 3/2009 | Zhamu et al. | |
| 2009/0272946 A1 | 11/2009 | Lu | |
| 2009/0291360 A1 | 11/2009 | Kim et al. | |
| 2010/0015531 A1 | 1/2010 | Dickinson et al. | |
| 2010/0075210 A1 | 3/2010 | Lee et al. | |
| 2010/0175934 A1* | 7/2010 | Lam et al. | 180/65.21 |
| 2010/0203362 A1 | 8/2010 | Lam et al. | |
| 2010/0214722 A1 | 8/2010 | Fujii et al. | |
| 2011/0151286 A1 | 6/2011 | Lam et al. | |
| 2011/0177392 A1 | 7/2011 | Hoshiba | |
| 2012/0244429 A1 | 9/2012 | Lam et al. | |
| 2012/0258336 A1 | 10/2012 | Jun et al. | |
| 2012/0263977 A1 | 10/2012 | Furukawa et al. | |
| 2014/0127565 A1 | 5/2014 | Furukawa et al. | |

FOREIGN PATENT DOCUMENTS

| | | |
|---|---|---|
| CN | 101132065 | 2/2008 |
| CN | 101414691 | 4/2009 |
| EP | 0 354 966 B1 | 1/1989 |
| EP | 0 354 966 A1 | 7/1989 |
| EP | 0 555 422 B1 | 2/1992 |
| EP | 0 662 726 A2 | 12/1994 |
| EP | 0 662 726 A3 | 12/1994 |
| EP | 0 801 834 B1 | 4/1996 |
| EP | 0 934 607 B1 | 9/1997 |
| EP | 0 964 416 A1 | 11/1997 |
| EP | 0 851 445 A2 | 12/1997 |
| EP | 0 851 445 B1 | 12/1997 |
| EP | 0 872 908 A1 | 4/1998 |
| EP | 0 872 908 B1 | 4/1998 |
| EP | 0 893 790 A2 | 7/1998 |
| EP | 0 893 790 B1 | 7/1998 |
| EP | 1 115 130 A1 | 8/1999 |
| EP | 1 000 796 A2 | 11/1999 |
| EP | 1 190 480 B1 | 6/2000 |
| EP | 1 071 148 A2 | 7/2000 |
| EP | 1 071 148 B1 | 7/2000 |
| EP | 1 126 536 A2 | 2/2001 |
| EP | 1 126 536 B1 | 2/2001 |
| EP | 1 179 871 A2 | 8/2001 |
| EP | 1 189 295 A2 | 9/2001 |
| EP | 1 189 295 B1 | 9/2001 |
| EP | 1 251 576 A2 | 4/2002 |
| EP | 1 315 227 A2 | 4/2002 |
| EP | 1 391 961 A1 | 8/2002 |
| EP | 1 391 961 B1 | 8/2002 |
| EP | 1 309 028 A2 | 10/2002 |
| EP | 1 309 028 B1 | 10/2002 |
| EP | 1 418 428 A1 | 11/2002 |
| EP | 1 496 556 A1 | 4/2003 |
| EP | 1 496 556 B1 | 4/2003 |
| EP | 1 541 422 A1 | 7/2003 |
| EP | 1 775 786 A1 | 7/2003 |
| EP | 1 561 105 B1 | 11/2003 |
| EP | 1 783 792 A1 | 7/2004 |
| EP | 1 386 336 B1 | 1/2006 |
| EP | 2 184 796 A1 | 7/2007 |
| FR | 2 692 077 | 12/1993 |
| JP | 59-105266 | 6/1984 |
| JP | 61-283173 | 12/1986 |
| JP | 62-103976 | 5/1987 |
| JP | 03-129667 | 6/1991 |
| JP | 4061214 | 2/1992 |
| JP | H04-43557 | 2/1992 |
| JP | 4-233170 | 8/1992 |
| JP | 4-294515 | 10/1992 |
| JP | H06-128317 | 5/1994 |
| JP | 09-092272 | 4/1997 |
| JP | H10-021900 | 1/1998 |
| JP | H10-294135 | 11/1998 |
| JP | H11-097319 | 4/1999 |
| JP | H11-224699 | 8/1999 |
| JP | 2000-1595 | 1/2000 |
| JP | 2000-13915 | 1/2000 |
| JP | 2000-21408 | 1/2000 |
| JP | 2000-077076 | 3/2000 |
| JP | 2000-235858 | 8/2000 |
| JP | 2001-110418 | 4/2001 |
| JP | 2001-126757 | 5/2001 |
| JP | 2001-313237 | 11/2001 |
| JP | 2001-319655 | 11/2001 |
| JP | 2001-332264 | 11/2001 |
| JP | 2001-351688 | 12/2001 |
| JP | 2002-47372 | 2/2002 |
| JP | 2002-50543 | 2/2002 |
| JP | 2002-50544 | 2/2002 |
| JP | 2002-75788 | 3/2002 |
| JP | 2002-118036 | 4/2002 |
| JP | 2002-298853 | 10/2002 |
| JP | 2002-367613 | 12/2002 |
| JP | 2003-51306 | 2/2003 |
| JP | 2003-77458 | 3/2003 |
| JP | 2003-87988 | 3/2003 |
| JP | 2003-132941 | 5/2003 |
| JP | 2003-200739 | 7/2003 |
| JP | 2003-308696 | 10/2003 |
| JP | 2004-47613 | 2/2004 |
| JP | 2004-55240 | 2/2004 |
| JP | 2004-55541 | 2/2004 |
| JP | 2004-134369 | 4/2004 |
| JP | 2004-221523 | 8/2004 |
| JP | 2004-273443 | 9/2004 |
| JP | 2004-355823 | 12/2004 |
| JP | 2005-32938 | 2/2005 |
| JP | 2005-050582 | 2/2005 |
| JP | 2005-50582 | 2/2005 |
| JP | 2005-80470 | 3/2005 |
| JP | 2005-160271 | 6/2005 |
| JP | 2005-183632 | 7/2005 |
| JP | 2005-248653 | 9/2005 |
| JP | 2005-294497 | 10/2005 |
| JP | 2005-327489 | 11/2005 |
| JP | 2005-353652 | 12/2005 |
| JP | 2006-156002 | 6/2006 |
| JP | 2006-252902 | 9/2006 |
| JP | 2006-310628 | 11/2006 |
| JP | 2006-325331 | 11/2006 |
| JP | 2007-012596 | 1/2007 |
| JP | 2007-506230 | 3/2007 |
| JP | 2007-226996 | 9/2007 |
| JP | 2007-280803 | 10/2007 |
| JP | 2008-22605 | 1/2008 |
| JP | 2008-47452 | 2/2008 |
| JP | 2008-047452 | 2/2008 |
| JP | 2008-146898 | 6/2008 |
| JP | 2008-150270 | 7/2008 |
| JP | 2008-171766 | 7/2008 |
| JP | 2009-104827 | 5/2009 |
| JP | 2009-135056 | 6/2009 |
| JP | 2009-219960 | 10/2009 |
| TW | I268005 | 12/2006 |
| WO | WO 89/06865 A1 | 7/1989 |
| WO | WO 94/07272 A1 | 3/1991 |
| WO | WO 92/11174 | 7/1992 |
| WO | WO 93/05541 A1 | 3/1993 |
| WO | WO 93/14511 A1 | 7/1993 |
| WO | WO 95/21466 | 8/1995 |
| WO | WO 95/23437 A1 | 8/1995 |
| WO | WO 96/11522 | 4/1996 |
| WO | WO 96/12313 | 4/1996 |
| WO | WO 96/17361 | 6/1996 |

(56) References Cited

FOREIGN PATENT DOCUMENTS

| | | |
|---|---|---|
| WO | WO 96/30959 | 10/1996 |
| WO | WO 97/12415 | 4/1997 |
| WO | WO 98/08266 | 2/1998 |
| WO | WO 98/19357 | 5/1998 |
| WO | WO 98/24100 | 6/1998 |
| WO | WO 98/40925 | 9/1998 |
| WO | WO 98/40926 A1 | 9/1998 |
| WO | WO 98/54816 | 12/1998 |
| WO | WO 99/24996 | 5/1999 |
| WO | WO 00/02213 | 1/2000 |
| WO | WO 00/11688 | 3/2000 |
| WO | WO 00/63929 | 10/2000 |
| WO | WO 01/01553 A1 | 1/2001 |
| WO | WO 01/17054 A1 | 3/2001 |
| WO | WO 01/41232 A2 | 6/2001 |
| WO | WO 01/95410 A1 | 12/2001 |
| WO | WO 02/01655 A2 | 1/2002 |
| WO | WO 02/052664 A2 | 7/2002 |
| WO | WO 02/087006 | 10/2002 |
| WO | WO 02/091412 A1 | 11/2002 |
| WO | WO 02/099956 A2 | 12/2002 |
| WO | WO 03/036670 A2 | 5/2003 |
| WO | WO 03/055791 A2 | 7/2003 |
| WO | WO 03/077333 | 9/2003 |
| WO | WO 03/088385 A1 | 10/2003 |
| WO | WO 03/094184 A1 | 11/2003 |
| WO | WO 03/098648 A1 | 11/2003 |
| WO | WO 2004/008560 A2 | 1/2004 |
| WO | WO 2004/012964 A1 | 2/2004 |
| WO | WO 2004/038051 A1 | 5/2004 |
| WO | WO 2004/042394 A2 | 5/2004 |
| WO | WO 2005/027255 A1 | 3/2005 |
| WO | WO 2005/041343 A1 | 5/2005 |
| WO | WO 2006/006218 A1 | 1/2006 |
| WO | WO 2006/062349 A1 | 6/2006 |
| WO | WO 2006/109909 | 10/2006 |
| WO | WO 2006/132052 A2 | 12/2006 |
| WO | WO 2007/017506 | 2/2007 |
| WO | WO 2007/034873 | 3/2007 |
| WO | WO 2007/050466 | 5/2007 |
| WO | WO 2007/058421 A1 | 5/2007 |
| WO | WO 2007/097534 | 8/2007 |
| WO | WO 2008/016236 A1 | 2/2008 |
| WO | WO 2008/051885 | 5/2008 |
| WO | WO 2008/070914 | 6/2008 |
| WO | WO 2008/101190 A1 | 8/2008 |
| WO | WO 2008/113133 | 9/2008 |
| WO | WO 2008113133 A1 * | 9/2008 ............. H01M 4/14 |
| WO | WO 2009/013796 | 1/2009 |
| WO | WO 2009/041180 | 4/2009 |
| WO | WO 2009/071292 | 6/2009 |
| WO | WO 2009/005170 | 8/2009 |
| WO | WO 2009/094931 | 8/2009 |
| WO | WO 2009/101047 | 8/2009 |
| WO | WO 2009/128482 | 10/2009 |
| WO | 2010122873 | 10/2010 |

OTHER PUBLICATIONS

Russian Patent Application No. 2012111683—Office Action (English translation included), mailed Sep. 3, 2014.
Chinese Patent Application No. 201080047297.07—First Notification of Office Action (English translation included), mailed Apr. 3, 2014.
European Patent Application No. 10814794.3—Search Report, mailed Dec. 2, 2013.
Japanese Patent Application No. 2012-52822—Office Action (English translation included), mailed Apr. 22, 2014.
Lam LT et al., "Development of ultra-battery for hybrid-electric vehicle applications", Journal of Power Sources 158 (2006) 1140-1148.
U.S. Appl. No. 13/996,934, Furukawa et al., filed Jun. 21, 2013.
English translation of JP Office Action in 2009-540546 mailed Nov. 8, 2013.
International Search Report for PCT/JP2010/055479 mailed Jun. 22, 2010.
U.S. Patent and Trademark Office, "Non-Final Office Action," issued in connection with U.S. Appl. No. 13/996,934, dated Jul. 9, 2014 (30 pages).
Derwent Abstract Accession No. 2004-395525/37, Shin Kobe Electric Machinery., (Apr. 30, 2004), 2 pages.
Derwent Abstract Accession No. 2004-683934/67, Mitsubishi Chem Corp., (Sep. 30, 2004), 2 pages.
Derwent Abstract Accession No. 2005-135458/15, TDK Corp., (Jan. 27, 2005), 2 pages.
Derwent Abstract Accession No. 2006-003619/01 Class L03 & JP 2005-327489 (Matsuhita Denki Sangyo KK.), Nov. 24, 2005 (2 pages).
Derwent Abstract Accession No. 2006-036969/05 Class A85, L03 (A14) & JP 2006-310628 (Nippon Zeon KK), Nov. 9, 2006 (2 pages).
Derwent Abstract Accession No. 2006-110075/11, Osaka Gas Co Ltd., (Jan. 19, 2006), 2 pages.
Derwent Abstract Accession No. 2006-643026/67 Class L03 & JP 2006-252902 (Kawasaki Heavy Ind Ltd.), Sep. 21, 2006 (2 pages).
Examiner's Report No. 2 on Australian Patent Appln. No. 2004273104 dated Sep. 21, 2009.
International Search Report for PCT/AU2004/001262, mailed Nov. 8, 2004.
International Search Report for PCT/AU2007/001916, mailed Feb. 21, 2008.
International Search Report for PCT/AU2008/000405, mailed May 20, 2008.
International Search Report for PCT/AU2010/001113, mailed Oct. 27, 2010.
International Search Report for PCT/AU2011/001647, mailed Mar. 23, 2012.
International Search Report for PCT/JP2010/064984, mailed Nov. 22, 2010.
International Search Report for PCT/JP2010/064985, mailed Nov. 30, 2010.
Office Action issued in U.S. Appl. No. 12/518,521 dated Jan. 17, 2013.
Office Action issued in U.S. Appl. No. 12/518,521 dated Jun. 9, 2014.
Office Action issued in U.S. Appl. No. 12/518,521 dated Mar. 10, 2015.
Office Action issued in U.S. Appl. No. 12/518,521 dated Nov. 6, 2013.
Office Action issued in U.S. Appl. No. 12/518,521 dated Oct. 25, 2012.
Office Action issued in U.S. Appl. No. 12/531,956 dated Apr. 17, 2014.
Office Action issued in U.S. Appl. No. 12/531,956 dated Aug. 1, 2012.
Office Action issued in U.S. Appl. No. 12/531,956 dated Feb. 21, 2012.
Office Action issued in U.S. Appl. No. 12/531,956 dated May 9, 2013.
Office Action issued in U.S. Appl. No. 12/531,956 dated Nov. 22, 2013.
Office Action issued in U.S. Appl. No. 12/531,956 dated Nov. 6, 2014.
Office Action issued in U.S. Appl. No. 12/531,956 dated Jul. 28, 2015.
Office Action issued in U.S. Appl. No. 13/392,651 dated Apr. 6, 2015.
Office Action issued in U.S. Appl. No. 13/392,651 dated Dec. 9, 2014.
Office Action issued in U.S. Appl. No. 13/392,651 dated Jun. 18, 2014.
Office Action issued in U.S. Appl. No. 13/392,651 dated Oct. 25, 2013.
Office Action issued in U.S. Appl. No. 13/392,651 dated Jan. 17, 2013.
Office Action issued in U.S. Appl. No. 13/392,734 dated Feb. 27, 2015.

(56) References Cited

OTHER PUBLICATIONS

Office Action issued in U.S. Appl. No. 13/392,734 dated Jul. 7, 2014.
Office Action issued in U.S. Appl. No. 13/392,774 dated May 21, 2015.
Office Action issued in U.S. Appl. No. 13/392,774 dated Sep. 30, 2014.
U.S. Appl. No. 12/110,913, Lara-Curzio et al., filed Apr. 28, 2008.
U.S. Appl. No. 12/156,644, Shi et al., filed Jun. 4, 2008.
U.S. Appl. No. 12/518,521, Lam et al., filed Apr. 13, 2010.
Office Action issued in U.S. Appl. No. 13/996,934 dated Dec. 24, 2015.
Office Action issued in U.S. Appl. No. 13/392,651 dated Oct. 13, 2015.
Office Action issued in U.S. Appl. No. 13/392,734 dated Oct. 7, 2015.
Office Action issued in U.S. Appl. No. 13/392,651 dated Mar. 23, 2016.

* cited by examiner

PROCESS FOR PRODUCING NEGATIVE PLATE FOR LEAD STORAGE BATTERY, AND LEAD STORAGE BATTERY

This application is the U.S. national phase of International Application No. PCT/JP2010/055479 filed 19 Mar. 2010 which designated the U.S. and claims priority to JP 2009-104825 filed 23 Apr. 2009, the entire contents of each of which are hereby incorporated by reference.

TECHNICAL FIELD

The present invention relates to a method for producing a negative plate for use in a lead-acid battery which is applicable in industrial fields such as hybrid vehicles or windmills and the like in which rapid charge/discharge operations are repeated under PSOC conditions and also relates to a lead-acid battery.

BACKGROUND ART

In the related art, national publication No. 2007-506230 of the Japanese translated version of the PCT application proposed a negative plate for use in a lead-acid battery which has such a configuration that a plate filled with a negative active material is constructed as its main body, and a coating layer of a carbon mixture is formed on the surface of the negative active material-filled plate, the carbon mixture being prepared formed by mixing at least two kinds of carbon materials selected from a first carbon material such as carbon black having conductive properties and a second carbon material such as activated carbon having capacitive capacitance and/or pseudo capacitive capacitance and a binding agent. Consequently, it is intended that the lead-acid battery thus produced can have an extended life span through the function of capacitors even when rapid charge/discharge operations are repeated under PSOC conditions.

PRIOR ART DOCUMENT

Patent Document

Patent Document 1 National publication No. 2007-506230 of the Japanese translated version of the PCT application

SUMMARY OF THE INVENTION

Problem to be solved by the Invention

However, in the negative plate proposed in the patent document 1, coupling between the negative electrode and the porous carbon mixture-coated layer having a capacitive function, i.e., between the carbon coating layer and the negative plate body disposed under the carbon coating layer, is achieved by a mechanical anchoring effect of the carbon coating layer. Therefore, in the course of various processes for producing a lead-acid battery using a subsequent formation process of the negative plate or an initial charge treatment process of the storage battery, etc., the carbon mixture-coated layer is easily peeled off from the surface of the negative electrode, and, as a consequence of the peeling off, the carbon mixture-coated layer can riot be performed sufficiently, so that deteriorating rapid discharge performance at low temperatures is brought about. Thus, the expected performance cannot be Obtained.

The present invention solves the above-mentioned problems and aims to provide a method for producing a negative plate for use in a storage battery capable of preventing an interfacial separation between the carbon mixture-coated layer and the negative plate body and resulting in improved conductive properties and to provide a lead-acid battery improved in rapid discharge performance at low temperatures.

Means for solving the Problem

As described in claim 1, the present invention lies in a method for producing a negative plate for use in a lead-acid battery, comprising the steps of: forming a coating layer of a carbon mixture at least in a part of a surface of a negative active material-filled plate, the carbon mixture being prepared by mixing two kinds of carbon materials consisting of a first carbon material having conductive properties and a second carbon material having capacitive capacitance and/or pseudo capacitive capacitance and a binding agent; generating a sufficient amount of lead ions enough to be moved from the negative active material-filled plate into the carbon mixture-coated layer; and performing a chemical that the carbon mixture-coated layer and the negative plate are connected and integrated, at least in a part of a respective interfacial surface thereof, by the precipitated lead.

Furthermore, as described in claim 2, the present invention lies in a lead-acid battery including the negative plate produced by the producing method described in claim 1.

Effect of the Invention

According to the invention according to claim 1, since a lead-acid battery negative plate is produced in such a manner that the interfacial surfaces of the negative plate body and the carbon mixture-coated layer are partially or entirely coupled together to be integral by the precipitated lead, the lead-acid battery negative plate thus produced is durable, peel resistant, and improved in its conductivity and further brings about improved battery characteristics.

According to the invention according to claim 2, since the lead-acid battery uses the negative plate having peel resistance and improved conductive properties as its negative electrode, it is possible to provide improvement in low-temperature rapid discharge performance under PSOC conditions.

MODE FOR CARRYING OUT THE INVENTION

The present invention will now be described in detail with reference to embodiments.

In producing a lead-acid battery negative plate according to the present invention, a negative active raw material mixed with a kneading solution of litharge and sulfuric acid, for instance, is filled in a porous current collector plate made from lead or a lead alloy, in a way similar to the conventional art. Thereafter, by a conventional method, the resultant negative active material-filled plate is changed into a treated one for using as an intermediate material for producing negative plate according to this invention. Namely, the negative active material-filled plate is changed into an aged negative plate by subjecting it to an aging treatment. Alternatively, the foregoing negative active material-filled. plate or the foregoing aged negative plate is changed into a formed negative plate by subjecting it to a formation treatment.

According to the present invention, in the first place, the negative active material-filled plate thus treated is heated and dried, and is then coated with a carbon mixture in at least a part of its surface, so that a carbon mixture-coated layer is formed. More in detail, the carbon mixture is applied entirely or partially on both or one of the surfaces of the plate, thus forming the carbon mixture-coated layer.

The carbon mixture comprises a mixture of a first carbon material ensuring conductive properties and a second carbon material ensuring capacitive capacitance and/or pseudo capacitive capacitance, and at least a binding agent.

By the way, when the negative active material-filled plate with the carbon mixture-coated layer is directly subjected to an initial charge treatment, in a case where it is subjected to a formation treatment, and then to an initial change treatment, in a case where it is the formed negative plate, it is subjected to an initial change treatment, whereby, respective surfaces of the respective negative plates coated with respective porous carbon mixture-coated layers are produced. However, in either cases, the bonding between the mutual interfacial surfaces of the negative active material-filled plate and the carbon mixture-coated layer is achieved merely by mechanical anchoring based on the binding agent. Therefore, an interfacial separation occurs during the formation treatment or the initial charge treatment, and the good formation treatment or the good initial charge treatment can not be performed, resulting in the negative plates decreased in the conductive properties or decreased capacitive capacitance, and when such negative plates are used as the negative electrodes of lead-acid batteries, deterioration in quick discharge characteristics and a shortened life of the battery are brought about.

To solve the above-mentioned problems, according to the present invention, it is intended that before the formation treatment and/or the initial charge treatment is carried out, a structure in which the carbon mixture-coated layer is formed on the negative active material-filled plate is subjected, as a means for coupling and integrating the carbon mixture-coated layer and the negative active material-filled plate with each other, to such a treatment that soaks the structure into an electrolytic solution and causing lead ions to move and diffuse from the negative active material-filled plate into the carbon mixture-coated layer in the soaked condition, and thereafter is subjected to the formation treatment and/or the initial charge treatment, and thereby the carbon mixture-coated layer and the negative active material-filled plate can be integrally coupled by precipitated lead at the interface thereof, and, as a result a lead-acid battery negative plate which is free from peeling and provides improved conductive properties can be produced.

As a means for generating lead ions and a means for precipitating lead thereafter, in a case where the formed negative plate is used as the negative active material-filled plate, the carbon mixture-coated layer is formed on the surface of the negative electrode and is then dried in the air, so that the carbon mixture-coated layer is made porous and simultaneously the negative active material is oxidized. As a result, when an electrolytic solution is poured or impregnated, lead ions are generated easily. Further, by prolonging a soaking time after the electrolytic solution is poured, diffusion of more lead ions into the porous carbon mixture-coated layer is made easier, and then the subsequent charge treatment is carried out, precipitation of lead is performed, and the above-mentioned integration is achieved. In addition, it is also effective to start the activation process of the negative active material from discharging for generating lead ions and then precipitating lead by the subsequent charging process.

Incidentally, if a conventional aged negative plate without a carbon mixture-coated layer is first subjected to the discharge treatment as mentioned above, for example, dissolved lead ions is precipitated on the surface of the negative electrode in a form of dendrite by the subsequent charging process, so that short-circuits are likely to occur easily. On the contrary, since the negative electrode of the present invention has a carbon mixture-coated layer, lead ions are trapped by the carbon mixture-coated layer, so that short-circuits will not occur.

Furthermore, in the course of the negative plate producing process of the present invention, the lead ions trapped by the second carbon material such as activated carbon that is mixed in the carbon mixture-coated layer are suppressed from reacting with sulfuric ions. Consequently, growing of lead sulfate crystals becomes difficult, which brings about such an environment that it is difficult to occur sulfation at the mutual interfacial surfaces of the negative plate body and the carbon mixture-coated Layer. Such an environment is also made in the inside and on the outer surface of the carbon mixture-coated layer. As a result, there is brought about production of a negative plate in which the negative plate body and the carbon mixture-coated layer are coupled together and integrally by lead and which is durable and free from interfacial separation and is improved in discharge characteristics at low temperatures, as will become clear later.

The composition of the carbon mixture is prepared by appropriately mixing 5-70 parts by weight of the first carbon material, 20-80 parts by weight of the second carbon material, 1-20 parts by weight of the binding agent, 0-10 parts by weight of a thickening agent, and 0-16 parts by weight of a short-fiber reinforcing agent.

The first carbon material is necessary for ensuring conductive properties, and suitable examples thereof may be carbon black such as acetylene black or furnace black, Ketjen black, graphite, and the like. At least one kind of these materials is selected and used.

If the content of the first carbon material is less than 5 parts by weight, it is difficult to ensure conductive properties, and capacitive capacitance is decreased. If the content exceeds 70 parts by weight, the conductive effect is saturated. Thus, more preferably, the content is 10-60 parts by weight.

The second carbon material is necessary for ensuring capacitive capacitance and/or pseudo capacitive capacitance, and suitable examples thereof may be activated carbon, carbon black, graphite, and the like. At least one kind of these materials is selected and used. If the content is less than 20 parts by weight, capacitive capacitance is insufficient, If the content exceeds 80 parts by weight, the relative proportion of the first carbon material is decreased, and resulting in decrease capacitance. Thus, more preferably the content is 30-70 parts by weight.

The binding agent is necessary for coupling the first and second carbon materials and coupling these carbon materials with the surface of a negative electrode constituting a lead-acid battery to ensure an electrical connection and maintaining a porous state of the coating layer. As the binding agent, polychloroprene, SBR, PTFE, PVDF, and the like are suitable. If the content is less than 1 parts by weight, the coupling is insufficient. If the content exceeds 20 parts by weight, the coupling effect is saturated, and the binding agent may become an insulator to decrease conductive properties. Thus, more preferably, the content is 5-15 parts by weight.

The thickening agent is useful for producing the carbon mixture in a paste form. Suitable examples of an aqueous paste may be cellulose derivatives such as CMC or MC, and the like polyacrylate, polyvinyl alcohol, and the like. Suitable examples of an organic paste may be NMP and the like. In the case of using the thickening agent, if the remaining content thereof exceeds 10 parts by weight, the conductive properties of the carbon mixture may be deteriorated. Therefore, the remaining content is preferably less than that content.

The short-fiber reinforcing agent is useful for suppressing occurrence of cracks of the carbon mixture by drying after the carbon mixture is produced in a paste state and applied to the negative active material-filled plate, to form a carbon mixture-coated layer. The reinforcing agent may comprise any material, such as, for example, carbon, glass, PET, and Tetron, (polyethylene ferephthalate fiber) and the like, as long. as it is stable in a sulfuric acid solution. Preferably, the reinforcing agent has a diameter of 20 μm smaller and a length. of 0.1 to 4 mm. If the content exceeds 16 parts by weight, the relative proportion of the carbon material or the binding agent is decreased, thus resulting in deterioration of performance and also decreasing conductive properties. Therefore, the content is preferably less than this content.

The content of the carbon binder is preferably 1-15 parts by weight with respect to 100 parts by weight of the negative active material constituting the lead-acid battery. If the content is less than 1 parts by weight, it is difficult to obtain a. sufficient coating effect. If the content exceeds 15 parts by weight, the coating layer becomes thick, so that the coating effect is saturated. More preferably, the content of the carbon mixture is 3-10 parts by weight. The porous carbon mixture-coated layer preferably has a porosity of 40% to 90%. If the porosity is less than 40%, movement of the electrolytic solution is suppressed, leading to degradation of discharge performance. If the porosity exceeds 90%, the capacitor function is saturated and the layer becomes thick, resulting in difficulty in designing. Thus, more preferably, the porosity is 50-80%.

More specific examples of the present invention will be described below

Example 1

Conventional formed positive plate and formed negative plate for use in a valve-regulated lead-acid battery were produced by a known method. 5 wt % of carbon mixture paste having the composition as shown in Table 1 below with respect to the filled active material weight of lead in terms of dry weight was applied to both entire surfaces of the formed negative plate exclusive of the tab portion thereof to form a coating layer of carbon mixture, and was then dried in the air for one hour at 60° C., so that a porous carbon mixture-coated layer was formed and simultaneously the negative active material of lead was oxidized. The porosity of the carbon mixture-coated layer at that time was 75%. The negative plate thus produced and the positive plate were stacked one with another through an AGM separator by the known method, so that an electrode plate group was assembled. The electrode plate group was accommodated in a battery container, and a 2-V lead-acid battery having 5-hour rate capacity of 10 Ah was produced under control of positive electrode capacity. In addition, a spacer was inserted so that the pressure applied to the electrode plate group may become 50 kPa.

Next, as an electrolytic solution, a sulfuric acid aqueous solution with a specific gravity of 1.30 in which aluminum sulfate 18-hydrate was dissolved at 30 g/l was poured into the lead-acid battery, and thereafter, immediately, the battery was charged for 20 hours with a current of 1 A and then discharged with a current of 2 A until the battery voltage reached 1.75 V. Thereafter, the batteries were charged again for 15 hours with a current of 1 A and discharged with a current of 2 A until the battery voltage reached 1.75 V. When the 5-hour rate capacity was measured, and a capacity of all of the batteries thus produced was 10 Ah.

TABLE 1

| | |
|---|---|
| First Carbon Material: Furnace Black | 45 parts by weight |
| Second Carbon Material: Activated Carbon | 40 parts by weight |
| Binding Agent: Polychloroprene | 10 parts by weight |
| Thickening Agent: CMC | 4 parts by weight |
| Short-Fiber Reinforcing Agent: Polyethylene Terephthalate | 5 parts by weight |
| Dispersion Medium: Water | 280 parts by weight |

Example 2

After the electrolytic solution was poured into the battery in Example 1, a soaking treatment was carried out for one hour before the battery was charged for 20 hours with a current of 1 A. Thereafter, except for this treatment, a lead-acid battery was produced in the same manner as in Example 1.

Example 3

A lead-acid battery was produced in the same manner as in Example 1 except that the carbon mixture paste-coated layer applied to both entire surfaces of the formed negative plate in Example 1 was dried in a non-oxidizing atmosphere, for instance, nitrogen atmosphere for one hour at 60° C. for preventing oxidization of the negative active material, and except that after lead-acid battery was made in the same manner as in Example 1 and the electrolytic solution was poured thereinto, the battery was discharged for 30 hours with a current of 1 A, before charging for 20 hours with a current of 1 A as in Example 1.

Example 4

A conventional aged positive plate and a conventional aged negative plate for use in a valve-regulated lead-acid battery were produced by a known method. Further, a lead-acid battery was produced in the same manner as in Example 1, except that 5 wt % of the carbon mixture with respect to the negative active material weight of lead in terms of dry weight was applied to both entire surfaces of the aged negative plate, to form a coating layer of the carbon mixture, and after an electrolytic solution was poured thereinto a soaking treatment was carried out for one hour before it was charged for 20 hours with a current of 1 A.

Comparative Example 1

A lead-acid battery was produced in the same conditions as in Example 1, except that the carbon mixture paste applied on the formed negative plate was dried in a non-oxidizing nitrogen atmosphere for one hour at 60° C.

Low-Temperature Quick Discharge Test

For each of the lead-acid batteries of Examples 1 to 4 and the lead-acid batteries of Comparative Example 1, a PSOC low-temperature discharge test was conducted as follows. That is, after discharging the fully-charged lead-acid battery for 2.5 hours with a current of 2 A to become a PSOC of 50%, it was left at −30° C. for 16 hours. Thereafter, the battery was discharged for 10 seconds with a current of 150 A, and the voltage of the battery was measured at 10 second voltage at discharge. Moreover, after the test, the respective lead-acid batteries were disassembled, and the presence of interfacial separation between the carbon mixture-coated layer and the negative plate body was examined. The test results are shown in Table 2.

TABLE 2

|  | Battery Voltage | Interfacial Separation |
|---|---|---|
| Example 1 | 1.35 V | Not Found |
| Example 2 | 1.45 V | Not Found |
| Example 3 | 1.25 V | Not Found |
| Example 4 | 1.40 V | Not Found |
| Comparative Example 1 | 1.05 V | Found |

As is clear from Table 2, the lead-acid batteries of Examples 1 to 4 of the present invention hardly decreased in voltage even by carrying out the quick discharge at the very low temperature under the low PSOC condition. This is because as described in Examples 1 to 4, the batteries were subjected to the treatment for generating a lot of lead ions in the vicinity of the negative electrode before carrying out the formation treatment or the initial charge treatment. As a result, the negative active Material-filled plate and the carbon mixture-coated layer were coupled and integrated by a lot of lead particulate precipitated at the mutual interfacial surfaces during the subsequent charge operation. Accordingly, the interfacial separation can be prevented, conductive properties becomes were improved, the voltage drop is suppressed, and the coating layer becomes improved in the capacitor function. On the other hand, the lead-acid battery of Comparative Example 1, which was not subjected to such a treatment as mentioned above, is resulted in the noticeable voltage drop, and the interfacial separation between them.

Further, also when the above-mentioned carbon mixture was applied entirely or partially to only one side surface or both side surfaces of the negative active material-filled plate and is then dried to form a carbon mixture-coated layer, and the resultant one was subjected to the lead ions generation treatment before the formation treatment or the initial charge treatment, in the same manner in Examples 1 to 4, negative plates without the interfacial separations can be produced and bring about lead-acid batteries improved in the low-temperature rapid discharge characteristics.

The invention claimed is:

1. A method for producing a negative plate for use in a lead-acid battery, comprising the steps of:
   forming a coating layer of a carbon mixture at least in a part of a surface of a negative active material-filled plate, the carbon mixture being prepared by mixing two kinds of carbon materials consisting of a first carbon material having conductive properties and a second carbon material having capacitive capacitance and/or pseudo capacitive capacitance and a binding agent;
   (i) performing, before an initial charge treatment, a soaking treatment of the plate in an electrolyte solution for at least about one hour after the electrolyte solution is poured or impregnated into the plate, to generate lead ions in an amount sufficient to enable movement of lead ions from the negative active material in the negative plate into the carbon mixture-coated layer; and
   (ii) performing the initial charge treatment to precipitate lead so that the carbon mixture-coated layer and the negative active material-filled plate are connected and integrated by the precipitated lead at the region of the interface between the carbon mixture-coated layer and the negative active material-filled plate.

2. A negative plate or a lead-acid battery comprising the negative plate obtainable or produced according to claim 1.

3. The method of claim 1, wherein the step of forming the coating layer of the carbon mixture comprises an air drying step such that porosity is introduced into the coating layer and the negative active material is at least partially oxidised.

4. The method of claim 1, wherein the soaking treatment of step i) is carried out for about one hour.

5. The method of claim 1, wherein the carbon mixture is provided in an amount of 1-15 parts per 100 parts of active battery material.

6. The method of claim 1, wherein the porosity of the coating layer of the carbon mixture is 40-90%.

7. The method of claim 1, wherein the composition of the carbon mixture comprises 5-70 parts by weight of the first carbon material, 20-80 parts by weight of the second carbon material, 1-20 parts by weight of a binding agent, 0-10 parts by weight of a thickening agent, 0-16 parts by weight of a short fibre reinforcing agent.

8. The method of claim 7, wherein the composition of the carbon mixture comprises 10-60 parts by weight of the first carbon material.

9. The method of claim 7, wherein the composition of the carbon mixture comprises 30-70 parts by weight of the second carbon material.

10. The method of claim 7, wherein the composition of the carbon mixture comprises 5-15 parts by weight of the binding agent.

11. The method of claim 7, wherein for the composition:
   the first carbon material is selected from at least one of carbon black, Ketjen black and graphite;
   the second carbon material is selected from at least one of activated carbon, carbon black and graphite;
   the binding agent is a polymer selected from at least one of polychloroprene, styrene-butadiene, polytetrafluoroethylene, and polyvinylidene fluoride;
   the thickening agent, when present, is selected from an aqueous paste agent or an organic paste agent;
   the short fibre reinforcing agent, when present, is selected from at least one of carbon, glass, polyethyleneterephthalate, and polytetrafluoroethylene.

12. The method of claim 7, wherein the reinforcing agent, when present, comprises fibres having a diameter of 20 μm or less and a length of between 0.1 to 4 mm.

13. The method of claim 1, wherein a discharging treatment is carried out prior to performance of the initial charge treatment.

14. The method of claim 1, wherein the discharging treatment of is carried out for about 30 hours.

* * * * *